United States Patent [19]

Brandt et al.

[11] Patent Number: 4,488,693
[45] Date of Patent: Dec. 18, 1984

[54] AIRCRAFT HANDLING SYSTEMS

[75] Inventors: Ulrich Brandt, Hamburg, Fed. Rep. of Germany; Anthony J. Gray, Midlothian, Scotland

[73] Assignee: MacTaggart Scott & Co., Ltd., Scotland

[21] Appl. No.: 299,923

[22] Filed: Sep. 8, 1981

[30] Foreign Application Priority Data

Sep. 5, 1980 [GB] United Kingdom ............ 8028800

[51] Int. Cl.³ ............................................. B64F 1/12
[52] U.S. Cl. .................................. 244/116; 244/17.17; 244/50; 414/241; 180/14.1
[58] Field of Search ............ 244/17.17, 115, 116, 244/114 R, 50, 63; 114/258, 261, 262; 180/14 C; 410/7, 8, 16, 77, 79, 80, 83; 414/240, 241, 230, 234, 253; 254/278, 279, 280, 283, 325, 387; 212/140, 141, 142

[56] References Cited

U.S. PATENT DOCUMENTS

| | | | |
|---|---|---|---|
| 1,816,010 | 7/1931 | Gros | 244/116 |
| 1,834,220 | 12/1931 | Purnell | 244/116 |
| 2,463,744 | 3/1949 | Clemens | 244/115 |
| 3,291,422 | 12/1966 | Van Valkenburg | 244/114 R |
| 3,640,490 | 2/1972 | Baekken | 244/116 |
| 3,756,419 | 9/1973 | Dean | 414/241 X |
| 4,319,722 | 3/1982 | Pesando | 244/116 |

FOREIGN PATENT DOCUMENTS

| | | |
|---|---|---|
| 933732 | 8/1963 | United Kingdom . |
| 1449442 | 2/1974 | United Kingdom . |
| 1448870 | 5/1974 | United Kingdom . |
| 1556892 | 11/1979 | United Kingdom . |

Primary Examiner—Trygve M. Blix
Assistant Examiner—Rodney Corl
Attorney, Agent, or Firm—Leydig, Voit, Osann, Mayer and Holt, Ltd.

[57] ABSTRACT

An aircraft handling system, particularly applicable to helicopters on board ship, said system incorporating a plurality of hydraulic winches for effecting movement of an aircraft from a first position to a second position; and secondary restraining mechanism preferably including hydraulically-actuated constant tension reels for controlling movement of an aircraft from said first position to said second position in order to prevent lateral movement or toppling of the aircraft.

22 Claims, 18 Drawing Figures

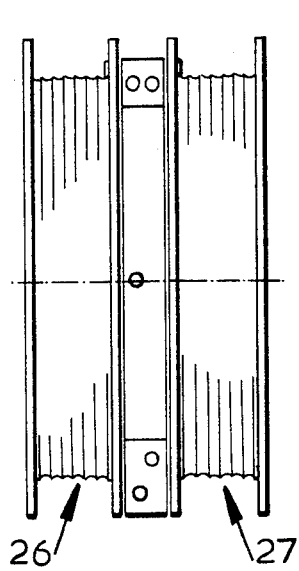
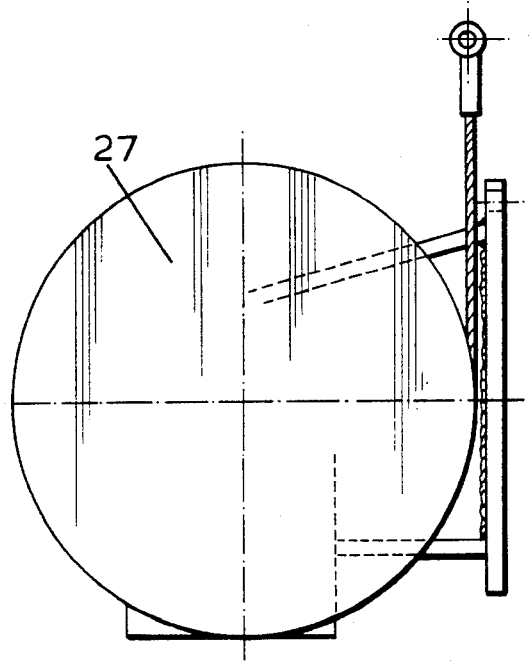
FIG.4A  FIG.4B
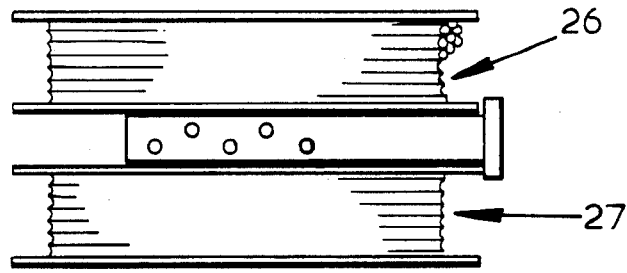
FIG.4C

4,488,693

AIRCRAFT HANDLING SYSTEMS

This invention relates to aircraft handling systems and particularly but not exclusively such systems for the deck handling of helicopters on board ships.

It has previously been proposed to provide ships with a helicopter landing pad on a fixed deck, the deck also being provided with a hangar for receiving a helicopter therein. In order to manoeuvre the helicopter from the pad to the hangar there has previously been employed a three winch handling system developed by the present Applicants. Other handling systems have been proposed such as that described in British Pat. No. 1556892.

Our three winch handling system referred to above has proved to be very effective in reasonable weather conditions but has been found to have limitations in more severe weather conditions.

Aircraft handling systems and, in particular, systems for handling helicopters on board ship have been previously proposed, for example, in U.S. Pat. No. 3,640,490 (Baekken) and U.S. Pat. No. 4,319,722 (Pesando). Such prior art arrangements involve the movement of a helicopter from a position on a flight deck incorporating a landing area into a hangar. In order to effect such movement, means are provided for guiding the helicopter into the hangar from the flight deck and such guide means involve the provision of a guide rail or the like extending over the surface of the flight deck and into the hangar. Such arrangements suffer from a major disadvantage in that the guide rail extending across the flight deck constitutes an undesirable obstruction thereon.

An object of the present invention is to provide improved means for assisting in the handling of aircraft, such as helicopters, on board ship or the like in adverse weather conditions which avoid the necessity of obstructions, such as guide rails or the like, across the flight deck of the vessel.

According to the present invention, there is provided an aircraft handling system for controlling movement of an aircraft on board a ship or the like, said system comprising primary winch means for effecting movement of an aircraft from a first position to a second position and secondary restraining means for controlling movement of the aircraft during its passage from said first position to said second position in order to prevent lateral movement or toppling of the aircraft, said secondary restraining means comprising a restraining reel having a wire or cable adapted to be attached to an aircraft at each side thereof and each wire being capable of being maintained under substantially constant tension.

Preferably, the secondary restraining means also include a restraining rail or rails in addition to the restraining reels. The restraining rail or rails are located solely within a hangar for aircraft to be accommodated.

As an alternative to the restraining rail or rails, the secondary restraining means can incorporate a trolley mechanism on which an aircraft can be releasably secured when within a hangar, said trolley being movable fore and aft within the hangar on fixed guide means.

Embodiments of the present invention will now be described, by way of example, with reference to the accompanying drawings in which.

Figure 5A:
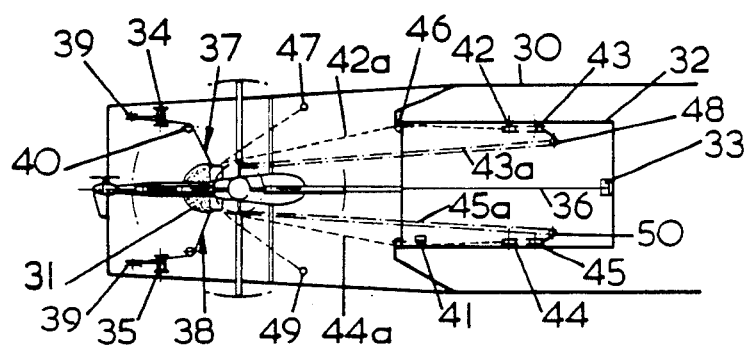
Figure 5B:
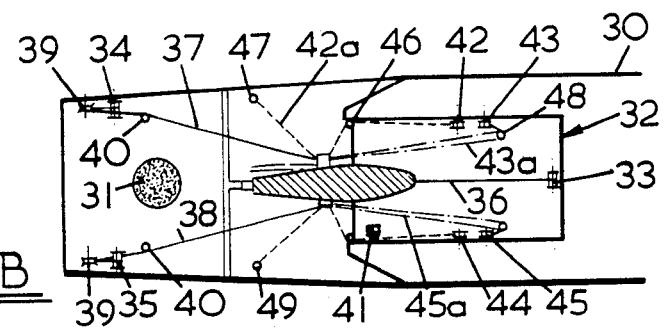
Figure 5C:
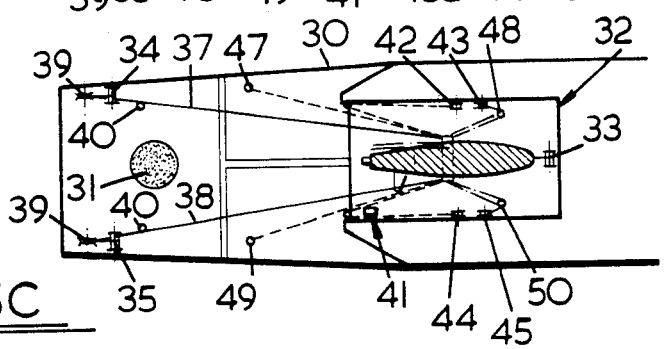
Figure 6A:
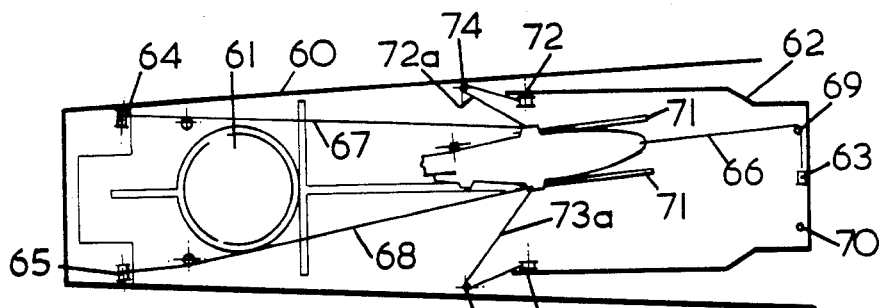
Figure 7A:
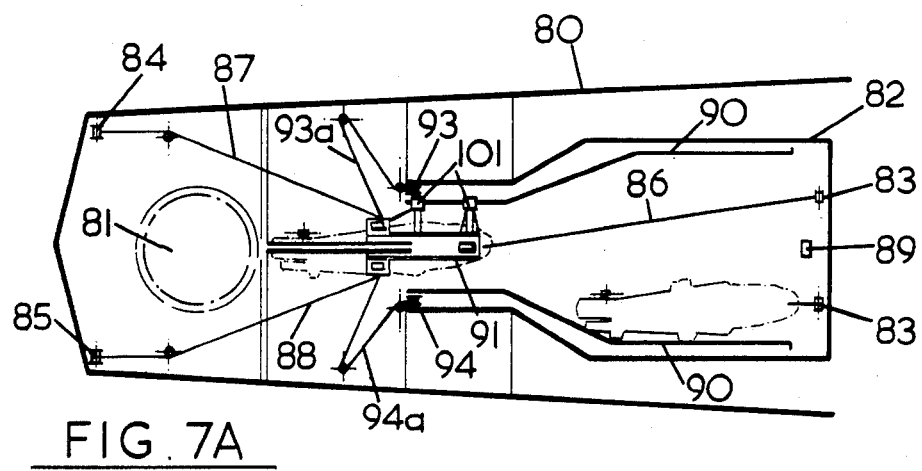
Figure 7B:
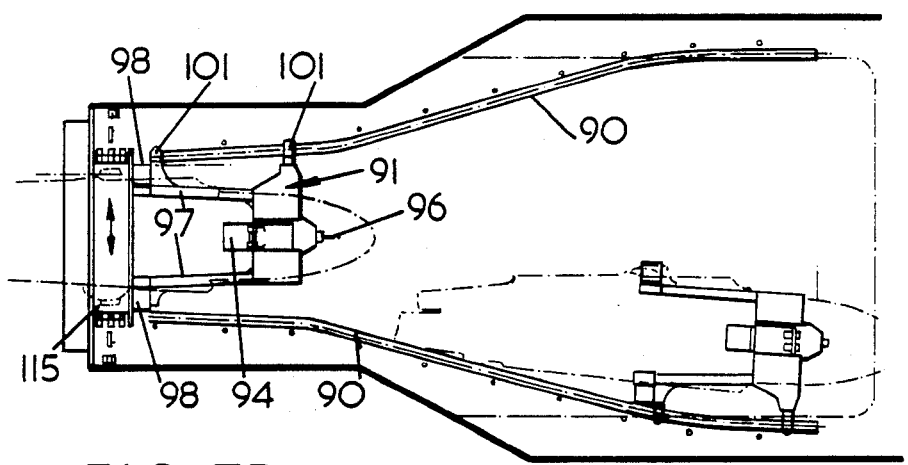
Figure 8:
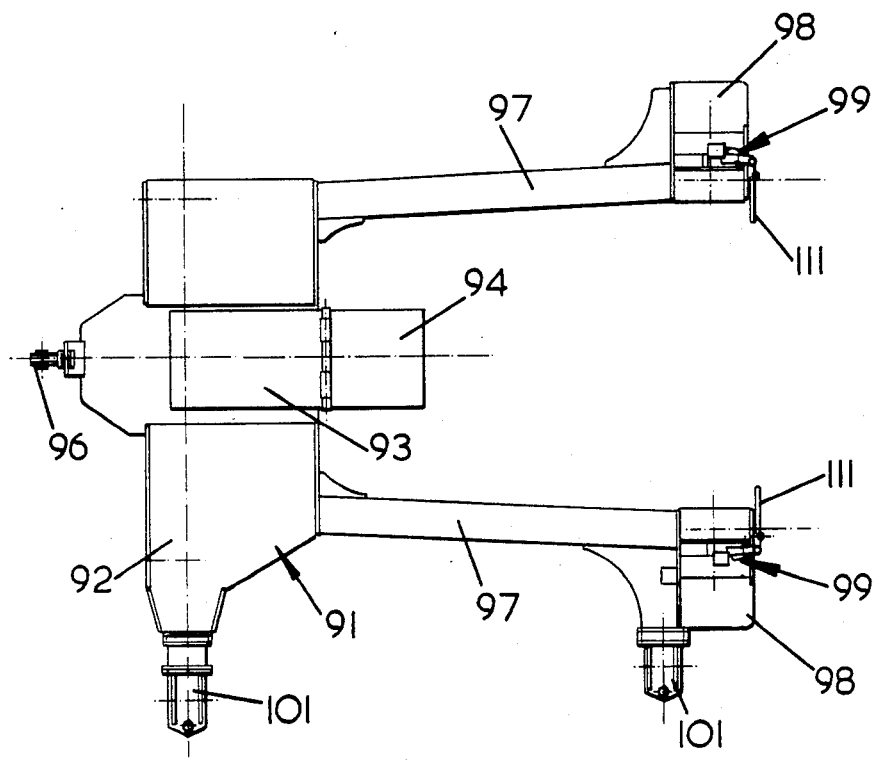
Figure 8A:
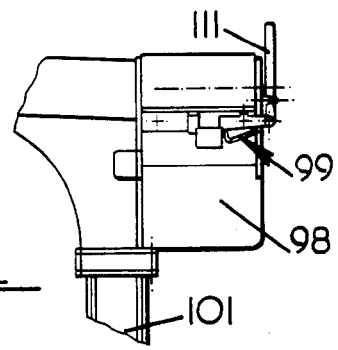
Figure 9:
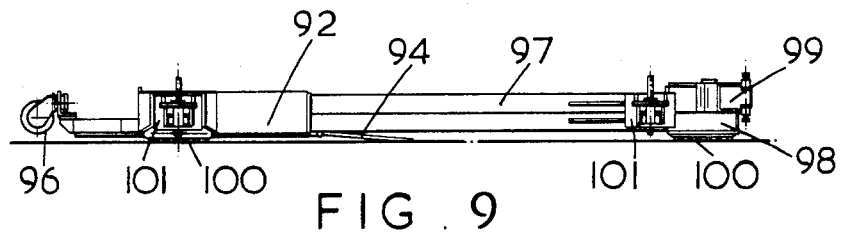
Figure 10:
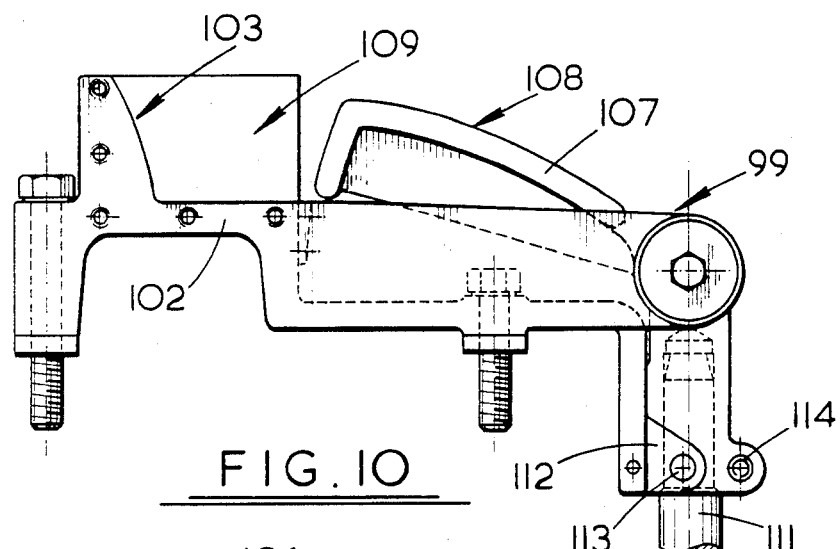
Figure 11:
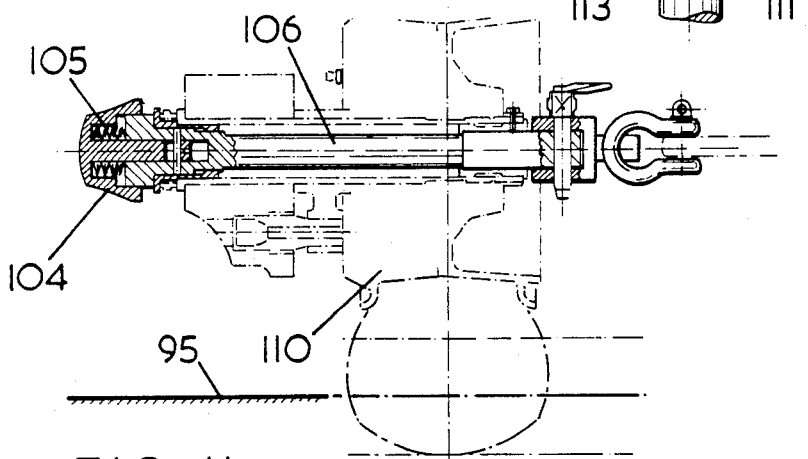

FIGS. 4A–C illustrate one form of restraining reel suitable for a restraining system of the present invention;

FIGS. 5A–C illustrate a first embodiment of restraining system in accordance with the present invention for a helicopter on board a ship;

FIGS. 6A and B illustrate a second embodiment of restraining system;

FIG. 7A illustrates a third embodiment of restraining system;

FIG. 7B is view to an enlarged scale of the embodiment of FIG. 7A illustrating an alignment mechanism;

FIG. 8 is a plan view of a trolley for use in the embodiment of FIG. 7;

FIG. 8A is an enlarged fragmentary view of a portion of the apparatus shown in FIG. 8;

FIG. 9 is a side view of the trolley of FIG. 8;

FIG. 10 is a detail view of a latch mechanism used in the trolley of FIGS. 7 and 8; and FIG. 11 is a sectional view illustrating a buffer stop mechanism on a helicopter wheel axle for use with the latch mechanism of FIG. 10.

Figure 1:
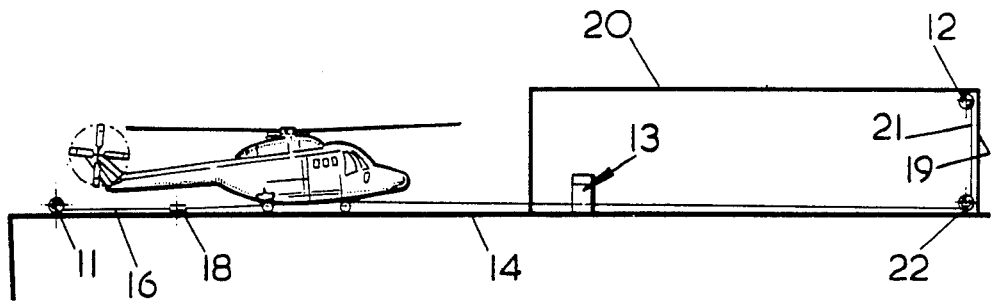
FIGS. 1 and 2 are diagrammatic representations illustrating a simple three winch helicopter handling system.
Figure 2:
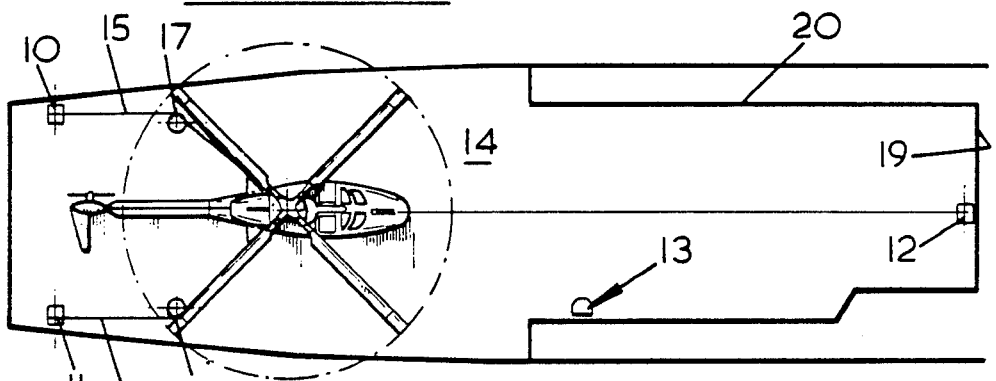

Referring to FIGS. 1 and 2 of the drawings, these figures illustrate our previously proposed three winch system for the handling of helicopters on board ship.

The three winch system comprises three hydraulically operated winches 10, 11 and 12, a control console 13 and a source of hydraulic power in the form of a pump set.

Two of the winches 10 and 11 are located aft, one port and one starboard respectively. These winches can be mounted under deck 14 with wires 15, 16 coming on to deck level round sheaves 17, 18 in order that all items of equipment will have a projection of less than 4½″ above the deck 14.

The third winch 12 is located high up on the forward bulkhead 19 of a hangar 20 with wire 21 being led down to deck level and around a sheave 22.

The control console 13 is normally situated close to the hangar door in order that an operator may have optimum viewing of any manoeuvre.

Provision can be made, if required, for an override STOP control, on a wandering lead, which can be operated from any position on the flight deck.

When it is required to move a helicopter from the hangar 20 to the landing deck 14, the wires 15, 16, 21 from the winches 10, 11 and 12 respectively are payed out and attached to strong points on the helicopter suspension system. A joystick control lever 13a of the control console is then displaced from a central position to release the winch brakes and the three wires 15, 16 and 21 are automatically tensioned. The control lever is then placed in the required direction of helicopter movement i.e. towards the landing area thereby causing the two aft winches 10 and 11 to haul with the hangar winch 12 providing back tension. Further movement of the control lever increases the speed. The helicopter can be manipulated within the framework provided by the three deck sheaves 17, 18, 22 such that one winch can haul with two providing back tension or two winches hauling and one providing back tension.

When moving the helicopter into the hangar, back tension supplied by the aft winches is automatically adjusted in order that the total forces on the helicopter are within a maximum value. When the hangar winch is hauling with a high load, the back tension or render value of the two aft winches will be small. When the hangar winch hauling load is reduced due to pitching, the render load from the two aft winches is increased automatically to give the correct balance of forces. In this manner the total load applied to the helicopter is reduced to a minimum whilst the correct net hauling load is adjusted to an optimum value.

If the joystick is allowed to return to the neutral position, the brakes on the winches are immediately applied and the helicopter will cease to move.

Each helicopter handling winch 10, 11, 12 comprises a grooved drum on which a ⅜" diameter steel wire is stored in a single layer. The drum is directly driven by a hydraulic motor contained within the diameter of the drum. The drum is braked by an internal multi-disc, spring-applied, hydraulically-released, fail-safe brake which runs immersed in oil. The drum rotates on low friction taper roller bearings. A rubber-covered friction roller is driven by the drum through a pinion and the action of this is to force the wires into the grooves and apply friction so that the coils can be held tightly on the grooves of the drum.

The motor and brake unit is housed within the drum in order to give a compact unit. The pressure that the roller can exert on the wire can be adjusted by an eccentric. The winch can be mounted in any position, and in a splash zone, and is suitably protected to withstand the marine environment.

The hydraulic motor is of a multi-cam principle described in our British Pat. No. 933,732. It is specifically designed for winch applications and has a high efficiency, approximately 93% of maximum theoretical at starting, during running and at stall. It can be used in exposed places and does not suffer from thermal shock with the result that no special heating lines are required. Ample torque capacity is available to break ice should the unit become iced up. The brake capacity is approximately 1½ times the maximum haul capacity.

The winches can be placed in virtually any attitude to make for ease of installation and to allow the wire rope to be led at the best attitude. In order to facilitate correct spooling a sheave or pulley placed approximately 6 ft away from the drum is advantageous in order to prevent excessive fleet angles being presented to the winch.

Figure 3:
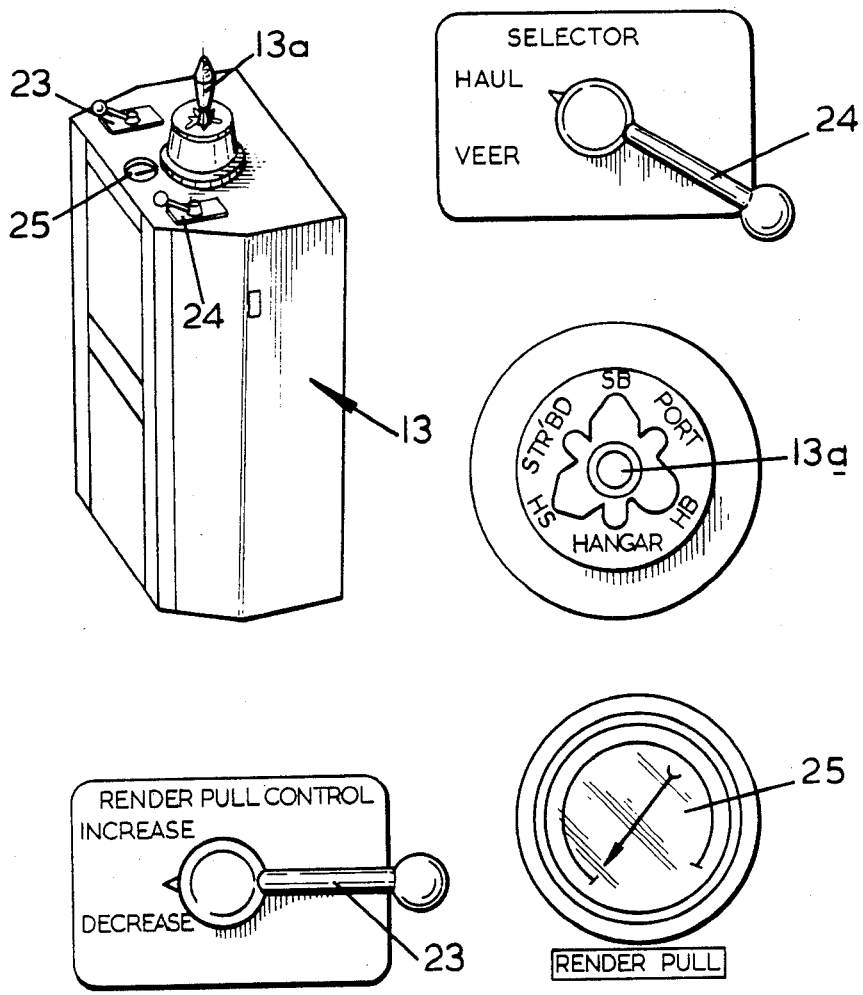
FIG. 3 illustrates a control console for a three winch system.

The control console 13 (FIG. 3) is a freestanding unit which is placed in the most advantageous position within the hangar to enable the operator to have the best view of the helicopter being manoeuvred between the deck and hangar. It is supplied with hydraulic pressure at between 2000 and 2500 PSI from the pumping set and controls all functions of the three winches 10, 11 and 12. Three hydraulic pipes, plus a drain line are connected to each winch, namely pressure, return and brake. The brake line to the three winches is common.

There are three controls on the console, namely, a render control 23 for back tension for the hangar winch, a haul/veer selector 24, and the main joystick control lever 13a.

The render control 23 is used to preset the back tension that will be applied by the hangar winch 12 to the helicopter when the two aft winches 10 and 11 are hauling. A gauge 25 indicates the render tension in pounds. This control is set dependent on the prevailing weather conditions. As stated above the back tension of the aft winches 10, 11, is automatically adjusted with reference to the hauling load being exerted by the hangar winch 12.

The haul/veer selector 24 merely selects whether the winches are to haul in or pay out when the joystick control 13a is operated. The selector will be put to veer when the wires are being attached to the helicopter. After attachment the selector will be put to haul.

The joystick control lever 13a controls the brakes and the required relative speeds of all the winches. It is also possible to use each winch individually which can be useful for other purposes not related to moving the helicopter. The joystick is spring loaded to the central position at which point the brakes of the winches are immediately applied.

Within the console all necessary control valves are housed to carry out the above functions: they are manually and hydraulically operated and therefore no electric supply is required.

The helicopter handling system requires a maximum output of approximately 9 U.S. Gals/min at a pressure of up to 2500 PSI. It is frequently convenient to use fluid from the pumping set to provide power for the servicing trolley for the helicopter. In this case, for certain aircraft, a 15 U.S. Gal/min pump is fitted with a 25 HP electric motor. The pumping set normally consists of a radial piston fixed displacement pump mounted vertically underneath the electric motor. The pump and motor are suitably mounted for shock and vibration resistance. The fixed delivery pump pumps fluid under pressure to an accumulator and when the accumulator has reached a pre-set pressure of approximately 2500 PSI the pump either goes on to by-pass, thereby returning fluid through the filter to the reservoir, or is on a stop/start control. An atmospheric reservoir of stainless steel is fitted and the pump, which is a modified version of a submarine pump, is capable of sucking fluid from the reservoir without a pressurised inlet. This type of pumping system is frequently used as the source of hydraulic power for a pressure main system, from which other items of hydraulic equipment can be driven. The pump, valves, accumulator etc., are standard components. The three winch system is of course capable of working from any existing hydraulic pressure source provided the pressure and volume required by the system are available.

As has previously been indicated, the above described three winch system is effective in moving helicopters from a landing pad to a hangar on board ship in calm sea states. It has recently been found desirable, however, to effect such helicopter movement in adverse sea states where for example the ship has an apparent roll of up to 30°. In order to effect helicopter movement under such adverse sea conditions, it is necessary to provide some additional means of restraining movement of the helicopter particularly athwartships. In accordance with the present invention it has been found convenient to do this by means of a restraining system comprising a plurality of hydraulically driven, constant tension restraining reels and associated wires. One form of restraining reel which is suitable for such restraining systems is illustrated in FIGS. 4A-4C. Such a reel is made up of a pair of grooved reel elements 26 and 27 controlled by a pawl mechanism (not shown).

Normally, the restraining reel will take up slack or pay out wire under a constant tension. Once the pawl mechanism operates, however, the restraining reel will only take up slack and will not permit paying out of the wire to take place.

Such restraint reels are utilised in restraining systems in accordance with the present invention and as illustrated in FIGS. 5-11 of the accompanying drawings.

In a first embodiment of restraining system as shown in FIGS. 5A–5C there is shown a ship 30 having a helicopter landing pad 31 and hangar 32 thereon. A three winch system comprising a hangar winch 33 and a port deck winch 34 and starboard winch 35 are disposed as shown. A wire 36 connects the hangar winch 33 to a helicopter and wires 37 and 38 from the winches 34 and 35 are led to the helicopter over guide sheaves 39 and deck sheaves 40 respectively. A control console 41 is provided just within the entrance to the hangar. Two port restraining reels 42, 43 and two starboard restraining reels 44, 45 are provided within the hangar. A wire 42a from restraining reel 42 can be led over deck sheave 46 and around a toroidal shackle (not shown) mounted adjacent the main wheel of the helicopter and thence to an anchor point 47. Similarly wires 43a, 44a and 45a can be led from their respective restraining reels and anchored at anchor points 48, 49 and 50 respectively after having passed through the shackle on the helicopter.

As shown in the series of FIGS. 5A, 5B and 5C the helicopter can be progressively manoeuvred from a landing position to a stowed position within the hangar using the combination of the three winch wires and restraining wires. The restraining wires do not assist in the manoeuvring of the helicopter but are merely there to give very substantial restraint when required. Each restraining reel gives a light positive tension to its wire of approximately 50 lbs thereby ensuring that the wires are at all times taut. When the control joystick is put into the central position, the brakes of the three winches are immediately engaged, together with the pawls of the restraining reels. This ensures that any slack wire which develops in the restraining system due to displacement of the aircraft suspension is taken up with a maximum restraining load available determined by the braking load of the restraining wires.

Two restraining reels 42, 44 (one port and one starboard) give restraint to the aircraft when on the deck and the other two reels 43, 45, can give the necessary restraint when the aircraft is in the hangar. This restraining system is very positive but has a disadvantage in that there are many wires around the aircraft. In order to alleviate this disadvantage a second embodiment of restraining system has been proposed as illustrated in FIGS. 6A and 6B.

Figure 6B:
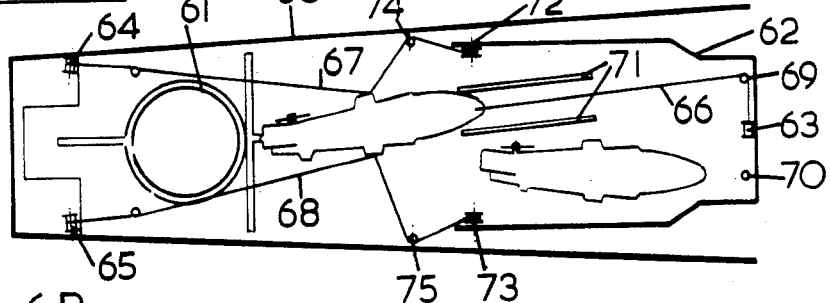

FIGS. 6A and 6B illustrate diagrammatically a ship 60 having a landing pad 61 and hangar 62. A three winch system consisting of hangar winch 63, port winch 64 and starboard winch 65 are provided for control wires 66, 67 and 68 respectively. The hangar winch has associated therewith a pair of deck sheaves 69 and 70. The hangar 62 is formed so as to permit the accommodation of two helicopters side-by-side. When a helicopter has to be introduced into the port side of the hangar, the wire 66 from the winch 63 is passed round the deck sheave 69 before being connected adjacent the nose of the helicopter. Alternatively, if an aircraft is to be introduced into the starboard side of the hangar, then the wire 66 is passed round the deck sheave 60 instead of the sheave 69. Within the hangar there is provided on the deck two pairs of elongated restraining abutment rails 71, one pair being for location of a helicopter on the port side of the hangar and the other pair being provided for a helicopter stowed in the starboard side of the hangar. Only the port pair are shown in FIGS. 6A and 6B. The rails can be permanently fixed or they can be hinged or removable as desired. They are not guide rails but are parallel to each other at a spacing such that the main wheels of an aircraft can straddle the rails with approximately two inches clearance on either side. Should the aircraft begin to slide when in the hangar, a buffer stop (not shown) associated with the main wheel axle will bump against one of the rails thereby absorbing the force and bringing the athwartships or transverse sliding of the helicopter to a stop.

One port and one starboard restraining reel 72 and 73 respectively are provided within the hangar 62 close to the entrance thereof. A wire 72a from the reel 72 passes round a guide sheave 74 before being connected to a helicopter adjacent its port main wheel and a wire 73a passes round a guide sheave 75 before being connected to the helicopter adjacent its starboard main wheel.

As before the three winch system is used to manoeuvre the helicopter from the landing pad 61 to hangar 62 and the restraining reels 72, 73 are controlled as required to provide substantial restraint while the aircraft is being manoeuvred from the landing pad 61 into the hangar. When the aircraft are in the hangar the rails 71 prevent athwartship movement of each helicopter as indicated above. The restraining wires 72a and 73a can be removed from the aircraft when the main wheels thereof straddle the rails 71. Alternatively, if desired, and if the layout permits the wires can remain attached until the helicopter is fully within the hangar.

FIG. 7 illustrates an embodiment of secondary restraining system for use in manoeuvring of a helicopter in safety in rough conditions. In this embodiment a ship 80 has a helicopter landing pad 81 and a compact double helicopter hangar 82. Although the hangar 82 is of sufficient dimension athwartships to accommodate two helicopters side-by-side, it will be noted that the entrance to the hangar is of reduced dimension so that only one helicopter can be introduced through the entrance at one time. As with the preceding embodiments, a three winch system is provided comprising two hangar winches 83 together with a port deck winch 84 and a starboard deck winch 85. Wires 86, 87 and 88 connect the winches to the helicopter in the normal way for control by a control console 89 located towards the forward bulkhead of the hangar. It will be understood that when an aircraft is to be introduced into the port side of the hangar, the port hangar winch 83 is employed and when an aircraft has to be introduced into the starboard side of the hangar, the starboard hangar winch 83 is employed.

Within the hangar and adjacent each of the port and starboard bulkheads of the hangar there is provided a guide bar 90 mounted on the deck which substantially follows the contour of its associated bulkhead. Carried by each guide bar 90 for movement therealong there is a guide trolley 91 (only the port trolley being shown diagrammatically in FIG. 7A).

The trolley 91 is illustrated in detail in FIGS. 8 and 9 and comprises a body 92 having a central platform 93 for receiving and supporting the nosewheel of a helicopter. Pivotally connected at the rear of the central platform 93 is a ramp 94 which extends between the raised central platform 93 and the hangar deck 95 (as shown best in FIG. 9) to receive a helicopter's nose wheel thereon and locate it on the central platform 93. When the nosewheel is in position on the platform 93, the nosewheel causes the ramp 94 to pivot so that it is clear of the deck.

The body 92 of the trolley is provided with a forwardly extending sheave or pulley 96.

Extending rearwardly from the body 92 at each side thereof are struts 97 which interconnect the body 92 and rear platforms 98 each being adapted to receive and locate the rear or main wheels of the helicopter by means of a latch mechanism 99 as illustrated in detail in FIG. 10.

The trolley 91 is supported on skates 100 (FIG. 9) on the underside of the trolley for movement along the deck, the trolley being guided along its guide bar 90 by two pairs of rollers incorporated in brackets 101.

As shown in FIG. 10, the latch mechanism 99 comprises a frame 102 having an angled abutment surface 103 for engagement by a correspondingly contoured buffer stop 104 spring-loaded by means of a spring 105 and carried, as shown in FIG. 11, by each main wheel axle 106 of the helicopter. The latch mechanism also incorporates a spring-loaded latch member 107 having an upper surface 108 which is depressed by the buffer stop when a helicopter is introduced into the latch mechanism. When the buffer stop 104 abuts against the abutment surface 103, the latch member 107 is projected inwardly by spring action to engage behind the buffer stop 104 and locate the buffer stop 104 in a vertical channel 109 defined by abutment surface 103 and latch member 107. It will be appreciated that the buffer stop 104, and consequently the helicopter, is thus restrained against movement in a fore and aft direction but can move in a vertical direction within the channel 109 so that variations in the height of main wheel 110 (FIG. 11) of the helicopter due to differing tyre pressures or loadings can be accommodated.

The latch mechanism can be manually released by inserting a bar 111 into a lever arm 112 which forms a bell-crank lever with latch member 107. The lever arm 112 can then be turned manually through approximately 30° to depress the latch member 107 against spring action. If desired the latch member can be held in this position by inserting a pin through cooperating holes 113 and 114 in the lever arm 112 and frame 102 respectively.

Located within the entrance to the hangar is a port restraining reel 93 and a starboard restraining reel 94. Wires 93a and 94e extend round deck sheaves 95, 96 and 97, 98 respectively for connection adjacent their respective main wheel 110 of a helicopter.

In operation of the system, a helicopter is manoeuvred from the landing pad 81 into the mouth of the hangar using the three winch system and under the restraining effect of the restraining wires 93a and 94a. Once the helicopter is in the mouth of the hangar it is rolled up a slight ramp and on to the sliding platform 115 (FIG. 7B) the position of which can be adjusted in a lateral direction by suitable hydraulic drive mechanism. The platform 115 receives the main wheels 110 of the helicopter and is adjusted laterally to align the main wheels with the rear platforms 98 and their associated latch mechanisms 99 of the trolley 91 which have to receive them. The hauling wire from the winch 83 having been connected over the sheave 96 and attached to the nose of the helicopter, is operated in conjunction with the other two winches 84, 85 and restraining reels 93, 94 if necessary to pull the helicopter into engagement with the latch mechanisms 99 on the trolley. The latch mechanism 99 as indicated above receives the aircraft axle no matter its height as a result of the degree of inflation of the aircraft tyres and positively defines the position of the aircraft relative to the trolley. The restraining wires 93a and 94a are released and, under the influence of the three winch system, the helicopter carried by the trolley 91 is guided positively along the associated guide bar 90 into its allocated position within the hangar. It will be appreciated that the guide bars 90 give athwartships restraint for each helicopter when it is within the hangar.

The embodiment shown in FIG. 7A illustrates a secondary restraining system incorporating both restraining wires 93a and 94a as well as restraining guide bars 90 and associated trolley 91. If desired, the restraining wires can be dispensed with and in this case the secondary restraint is provided solely by the bars 90 and trolley 91 with their associated aircraft locating mechanisms.

The various embodiments of restraining system described above have particular advantages in that they can be operated from the same control console as the three winch system with which it is used and minimal modification is required to incorporate the restraining equipment. Accordingly, both the three winch system and the associated restraint system can easily be fitted to new ships or ships already in service without major structural modification. It will further be appreciated that, in the various foregoing embodiments according to the invention, the use of restraining reels to prevent lateral movement or toppling of the aircraft provides an arrangement wherein the wires associated with each restraining reel can be stowed when not in use so as to leave the flight deck clear of obstruction.

It will be appreciated that one or two deckhands can attach the necessary wires to a helicopter in a short space of time and thereafter a single operator at the control console can tension all the wires. He can then proceed to manoeuvre the helicopter and the system does not depend on tractive effort between the aircraft wheels and the deck for movement. If desired, a further operator having a wandering lead control can arrest the movement of a helicopter at any instant. When he releases control the console operator can take over again.

It will be readily appreciated that the arrangements described above are entirely hydraulically operated. The hydraulic mechanisms have not been described, however, as there is not considered to be anything novel in such hydraulic mechanisms per se as they make use of well known principles and components and their manner of operation will be readily apparent to those skilled in the hydraulic art.

The present invention has been found advantageous in vessels such as icebreakers due to the fact that the reaction of the tractive effort comes from the ship's structure rather than being dependent upon the coefficient of friction between the wheels and the deck which can become severely iced.

What is claimed is:

1. An aircraft handling system for controlling movement of an aircraft on board the deck of a ship or the like to and from a hangar, the deck being maintained free end clear of guide rails and obstructions extending exterior of the hangar, said system comprising primary winch means for effecting movement of an aircraft from a first position on said deck to a second position within said hangar, and secondary restraining means for controlling movement of the aircraft during its passage from said first position to said second position in order to prevent lateral movement or toppling of the aircraft, said secondary restraining means comprising a restraining reel in fixed position on said ship having a wire adapted to be attached to an aircraft at each side thereof during passage of the aircraft from said first position to said second position and each wire being capable of being maintained under substantially constant tension during movement of the aircraft between said positions, the aircraft during passage on said deck being moved solely by said primary winch means while being restrained by said secondary restraining means.

2. An aircraft handling system as defined in claim 1, in which the primary winch means comprises three winches adapted to cooperate with each other to effect movement of an aircraft, at least one of said winches being adapted to act in a hauling mode and at least one of said winches being adapted to provide back tension thereto.

3. An aircraft handling system as defined in claim 1, in which each restraining reel of the secondary restraining means includes means engageable to permit travel of the wire in only one direction.

4. An aircraft handling system as defined in claim 1, in which the secondary restraining means comprises at least two reels located to the starboard side of an aircraft being handled and at least two reels on the port side thereof.

5. An aircraft handling system as defined in claim 1, in which the second position is within an aircraft hangar and the secondary restraining means incorporate elongated abutment means fixed in position to the deck within said hangar, said abutment means being adapted to abut fixedly the aircraft to assist in preventing transverse sliding thereof within said hangar.

6. An aircraft handling system as defined in claim 5, in which the elongated abutment means comprises a pair of parallel abutment surfaces in relation to which wheels of the aircraft can be disposed in operative relationship on operation of the primary winch means.

7. An aircraft handling system as defined in claim 6, in which the abutment means comprises a pair of parallel rails between which the wheels of the aircraft can be accommodated.

8. An aircraft handling system as defined in claim 1, in which the second position is within an aircraft hangar and the secondary restraining means includes a trolley movable within said hangar and adapted to receive releasably wheels of the aircraft thereon, and guide means fixed to the deck for guiding the trolley to a desired location within the hangar on operation of the primary winch means.

9. An aircraft handling system as defined in claim 8, in which the guide means for guiding the trolley is a guide bar operatively associated therewith, said guide bar being positioned entirely within the hangar.

10. An aircraft handling system as defined in claim 8, in which a laterally-actuatable alignment means is provided for receiving the aircraft wheels so as to enable alignment of the aircraft with the trolley prior to its reception thereon.

11. An aircraft handling system as defined in claim 8, in which the trolley has a plurality of wheel-receiving locations thereon for receiving each of the wheels of an aircraft, and latch means associated with at least one of said wheel-receiving locations for restraining movement of the aircraft relative to the trolley.

12. An aircraft handling system as defined in claim 11, in which the latch means permits limited vertical movement of the aircraft so that height variations due to tyre pressure variations or aircraft loading variations can be accommodated.

13. An aircraft handling system as defined in claim 11, in which the latch means comprises a fixed abutment surface and a movable latch member which define a vertical channel therebetween, said latch member being displaceable by a fixture on the aircraft wheel on passage of the aircraft on to the trolley and to engage subsequently said fixture to locate it within said channel.

14. An aircraft handling system as defined in claim 8, in which the trolley comprises a body having a first central platform for receiving a nose wheel of an aircraft, rear platforms for receiving each main wheel of the aircraft, and latch means associated with each of said rear platforms.

15. An aircraft handling system as defined in claim 14, in which the trolley is provided with a raisable ramp to facilitate passage of the nose wheel on to the central platform.

16. An aircraft handling system as defined in claim 8, in which the trolley is provided with skate means on its underside to facilitate passage over a deck within the hangar.

17. An aircraft handling system as claimed in claim 8, in which the trolley is provided with a sheave or pulley adjacent its forward portion, said sheave or pulley being adapted to receive a wire or cable extending between one of the winches and the forward portion of the aircraft.

18. A trolley for an aircraft handling system, comprising a plurality of wheel-receiving locations thereon for receiving each of the wheels of an aircraft and latch means associated with at least one of said wheel-receiving locations for restraining movement of the aircraft relative to the trolley, said latch means comprising a fixed abutment surface and a movable latch member which define a vertical channel therebetween, said latch member being displacable by a fixture on an aircraft wheel on passage of the aircraft on to the trolley and to engage subsequently said fixture to locate it within the channel.

19. A trolley as defined in claim 18, in which the trolley comprises a body having a first central platform for receiving a nose wheel of an aircraft, rear platforms for receiving each main wheel of an aircraft, and latch means associated with each of said rear platforms.

20. A trolley as defined in claim 19, in which the trolley is provided with a raisable ramp to facilitate passage of the nose wheel on to the central platform.

21. A trolley as defined in claim 18, in which the trolley is provided with skate means on its underside to facilitate passage over a deck.

22. A trolley as defined in claim 18, in which the trolley is provided with a sheave adjacent its forward portion.

* * * * *